United States Patent [19]

Jones et al.

[11] 4,227,032

[45] Oct. 7, 1980

[54] POWER FEED THROUGH FOR VACUUM ELECTRIC FURNACES

[75] Inventors: William R. Jones, Chalfont; Rush B. Gunther, Abington, both of Pa.

[73] Assignee: Abar Corporation, Feasterville, Pa.

[21] Appl. No.: 3,658

[22] Filed: Jan. 15, 1979

[51] Int. Cl.³ .......................... H05B 3/08; H05B 7/16
[52] U.S. Cl. ...................................................... 13/20
[58] Field of Search ....................... 13/20, 24; 174/211

[56] References Cited

U.S. PATENT DOCUMENTS

| | | |
|---|---|---|
| 1,837,256 | 12/1931 | Egan . |
| 2,837,654 | 6/1958 | Berghaus . |
| 3,437,784 | 4/1969 | Jones et al. . |
| 3,650,930 | 3/1972 | Jones et al. . |
| 3,761,370 | 9/1973 | Keller . |
| 4,077,783 | 3/1978 | Honacker ........................ 174/211 X |
| 4,102,637 | 7/1978 | Kreider et al. ..................... 13/32 X |
| 4,124,199 | 11/1978 | Jones et al. ............................ 266/88 |

OTHER PUBLICATIONS

Case Hardening, Metals Handbook, 1948, American Society for Metals, pp. 677–702.

*Primary Examiner*—Roy N. Envall, Jr.
*Attorney, Agent, or Firm*—Zachary T. Wobensmith, 2nd; Zachary T. Wobensmith, III

[57] ABSTRACT

A power feed through for vacuum electric furnaces is provided for furnaces in which work pieces to be processed are placed inside a vacuum electric furnace chamber which is evacuated with a mechanical pump and then backfilled with a partial pressure of gas containing nitrogen, such as nitrogen or ammonia, or a hydrocarbon such as methane, or mixtures thereof. The work pieces to be processed are electrically connected to the negative (cathode) terminal of a D.C. power supply, the positive terminal being connected to the chamber wall and to ground. The power supply is energized and a portion of the gas is ionized. The work pieces are heated to temperatures of approximately 650° to 1100° F. for ion nitriding or to temperatures of approximately 1650° to 1900° F. for ion carburizing. The heating is effected at least in part by the ion activity but auxiliary heating elements may be used if desired. Materials that are sputtered from the work travel in straight lines, tend to build up on work supports and power feeders thereby causing electrical shorting. Shorting is greatly reduced in this structure by the use of shields in the form of spaced insulating discs carried on the power feeders.

5 Claims, 3 Drawing Figures

POWER FEED THROUGH FOR VACUUM ELECTRIC FURNACES

CROSS REFERENCE TO RELATED APPLICATION

In the application of Rush B. Gunther and Prem C. Jindal for Work Support for Vacuum Electric Furnaces, filed Dec. 20, 1978, Ser. No. 971,483, provisions are made for protecting a work support against metallic deposition, this application disclosing structure for protecting a power feed through.

BACKGROUND OF THE INVENTION

1. Field of the Invention

This invention relates to a power feed through for vacuum electric furnaces wherein case formation on ferrous metals is provided by ions in the furnace and the protection of the power feed through against shorting.

2. Brief Description of the Prior Art

The process of case formation has been previously described in American Society for Metals, Metals Handbook, Vol. 2, commencing at p. 677, wherein is described the carburization of a surface of a ferrous work piece or ion nitriding of the surface of a work piece which provides a case which may be hardened as the case is formed or which may subsequently be hardened.

Examples of ion nitriding by ionization in a chamber of a nitrogen containing gas are shown in the U.S. Patents to Egan, U.S. Pat. No. 1,837,256, Berghaus et al., U.S. Pat. No. 2,837,654, Keller, U.S. Pat. No. 3,761,370 and Jones et al., U.S. Pat. Nos. 3,437,784 and 3,650,930.

The prior systems were particularly subject to arcing if the power input is high, which materially decreased the effectiveness of the process.

In the U.S. Patent to Jones et al., U.S. Pat. No. 3,437,784 a power supply is shown which is intended to limit arcing by limiting the current.

In utilizing ions for surface treatement in case formation materials sputtered from the work in the previously available equipment tended to build up on components in the furnace, including power feeders, causing arcing, excessive power requirements and shorting out of the electrical system.

The power feed through of our invention does not suffer from the problems encountered in previously available structures and has positive advantages.

SUMMARY OF THE INVENTION

In accordance with the invention a power feed through for use in vacuum electric furnaces is provided, wherein work pieces on which a case is to be formed are placed in a vacuum electric furnace chamber which is evacuated by a mechanical pump, and then backfilled with a partial pressure of an ionizable gas or mixture of ionizable gases. The work pieces to be processed are electrically connected to the negative terminal of a D.C. power supply through the power feed through which is protected against metallic ion deposition thereon, the positive terminal being connected to the chamber wall and to ground. Energization of the power supply is effective to ionize some of the gas, the work pieces being at least partially heated by ion activity and, if desired, by auxiliary heating of the intermediate space of the vacuum chamber, to form a nitrided and/or carburized case.

It is the principal object of the invention to provide a power feed through for use in vacuum electric furnaces wherein the feed through is protected against heat and metallic build up thereon.

It is a further object of the invention to provide a power feed through for vacuum electric furnaces which is simple and inexpensive to construct but will have a long service life.

Other objects and advantageous features of the invention will be apparent from the description and claims.

BRIEF DESCRIPTION OF THE DRAWINGS

The nature and characteristic features of the invention will be more readily understood from the following description taken in connection with the accompanying drawings forming part hereof in which.

Figure 2:
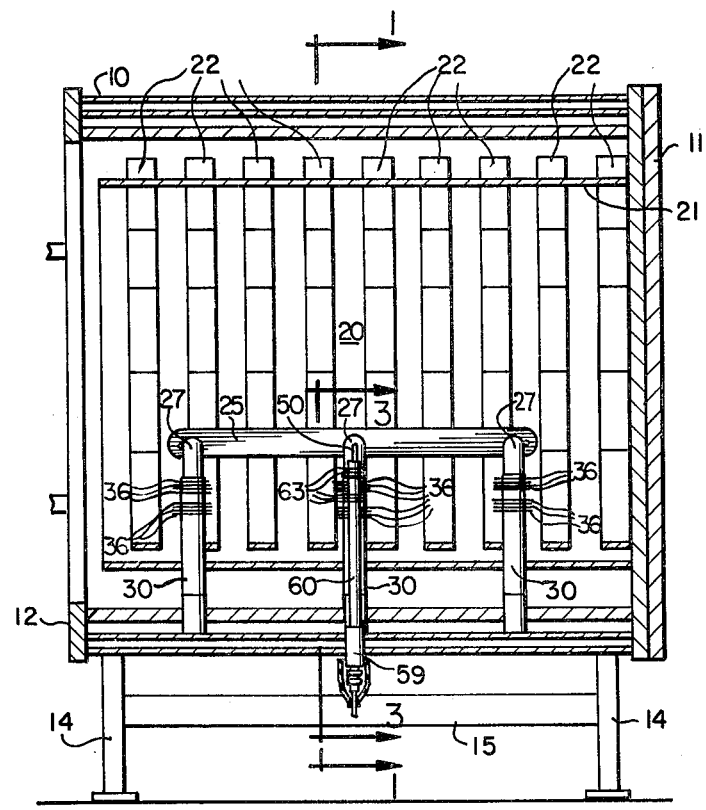
FIG. 2 is a longitudinal sectional view taken approximately on the line 2—2 of FIG. 1.

It should, of course, be understood that the description and drawings herein are illustrative merely and that various modifications and changes can be made in the structure disclosed without departing from the spirit of the invention.

Like numerals refer to like parts throughout the several views.

DESCRIPTION OF THE PREFERRED EMBODIMENT

Referring now more particularly to the drawings, in which a preferred embodiment of apparatus is illustrated, a vacuum furnace of any desired type is provided, the furnace illustrated being horizontal preferably having an outer cylindrical wall or shell 10 closed at one end in any desired manner, such as by a door or an end closure plate 11. A door (not shown) is provided, hingedly mounted on the wall 10 at the other end and movable to a closed position with respect to the front end flange 12 of the shell 10. Suitable vacuum tight packing (not shown) is interposed between the door (not shown) and the end flange 12 of the wall 10.

The shell 10 can be supported in any desired manner, such as by supports 14 with suitable intermediate bracing 15.

Suitable provisions (not shown) can be made for evacuating the furnace chamber and for providing a suitable gas or gas mixture to supply ions. One suitable apparatus for this purpose is shown in U.S. Pat. No. 4,124,199, dated Nov. 7, 1978 to William R. Jones and Prem C. Jindal.

A vacuum chamber 20 is thus provided within the shell 10, the closure wall 11 and the door (not shown).

Within the shell 10, a cylindrical ring heat shield 21 is provided for reflecting heat inwardly within the shell 10 and reducing heat leakage outwardly.

Within the shield 21, a plurality of spaced alloy metal strip type heating elements 22 are preferably provided disposed from end to end within the chamber 20. The heating elements 22 are supported in any desired manner and are provided with conductors 23 and 24 extending through sealing bushings in the shell 10 for activation when desired.

Within the chamber 20, horizontal work supports of heat resistant metal such as a refractory metal are provided which include rails 25 extending lengthwise in the chamber 20. The rails 25 are carried in slots 26 in rail holders 27 and are centered by pins 28. The rail holders 27 are of heat resistant conductive metal and may be supported in any desired manner such as by shielded rods 30 as shown in the application of Rush B. Gunther and Prem C. Jindal, for Work Support for Vacuum Electric Furnaces, filed Dec. 20, 1978, Ser. No. 971,483. Any other suitable work supports may be employed.

The power feed through includes a conductor 50 connected to a source of electrical energy (not shown) and which extends into a connector assembly 51 which includes an outer boot 52 of insulating material surrounding the conductor 50.

The conductor 60 in assembly 51 is carried in a bushing 53 preferably made of pliable insulating material which is detachably retained on conductor 50 by two adjustable clamps 55.

The conductor 50 and its insulation 61 extends exteriorly of the shell 10 through a seal assembly 56 which includes a bushing 57 in threaded engagement with reducing bushing 58 which is engaged with a sleeve 59 which extends through the shell 10 of the tank and is secured thereto by any suitable means such as welding.

Figure 1:
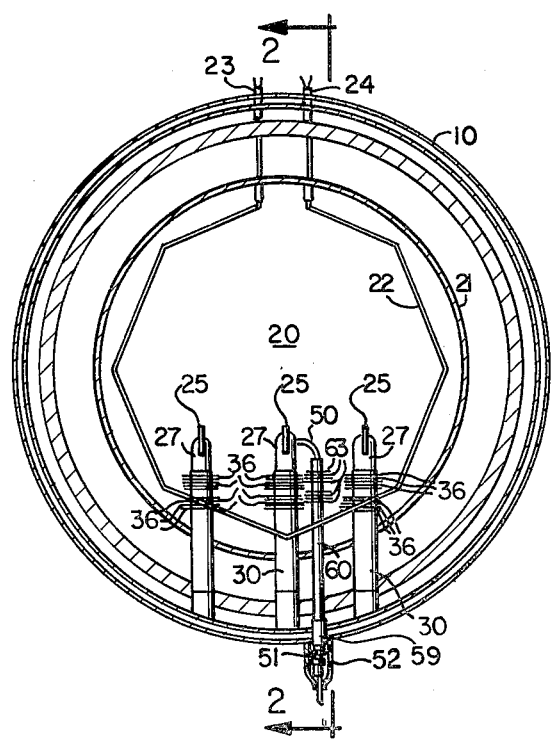
FIG. 1 is a transverse vertical sectional view of a vacuum chamber taken approximately on the line 1—1 of FIG. 2, and illustrating the power feed through of our invention.
Figure 3:
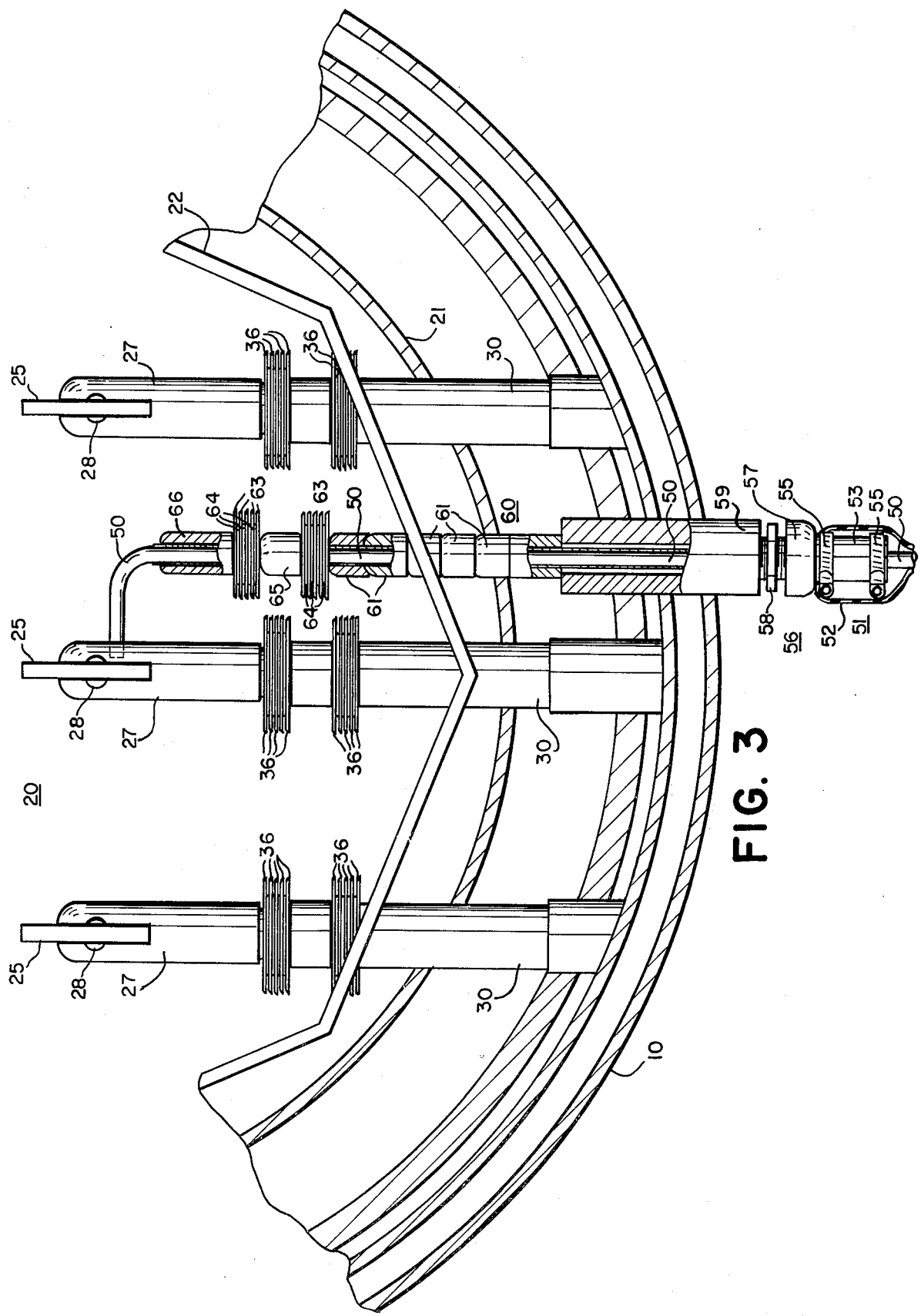
FIG. 3 is a fragmentary transverse sectional view, enlarged, of a portion of FIG. 2.

Within the shell 10 the conductor 50 extends upwardly as seen in the FIGS. 1, 2 and 3 and is carried within an outer insulating covering 60, of a suitable refractory insulating material. The covering 60 is of flexible construction such as a plurality of successive insulating elements 61 of the fish spine type in which the elements 61 are substantially cylindrical with one end convexly curved and the other end of complemental concave shape. The structure is readily capable of expansion and contraction as a result of temperature or load variation.

At the upper end of the covering elements 61, a plurality of spaced discs 63, preferably formed of a high temperature resistant non-electrical conductive material such as mica, asbestos, or other suitable material, are carried on the conductor 50.

The discs 63 have discs 64 of similar material therebetween of lesser diameter to provide spaces between the discs 63. The discs 63 are preferably provided in two groups, five being shown in each group with a spacer tube 65 of ceramic between the groups. The discs 63 at the perimeter thereof have downturned edges 66 which resist metal collection and bridging therebetween.

It will be noted that the assembly and disassembly of the covering 60, the lower and upper group of discs 63 and 64 with their spacer tubes 65, is relatively simple so that inspection, maintenance and replacement, as necessary, of various components can be quickly and easily carried out.

In use the power feed through 50 connected to the rail 25 provides for a positive supply of electrical energy to precisely the location desired being where the work (not shown) is placed for ion nitriding or carburizing. In the hostile environment in the furnace chamber 20 the spaced arrangement of the discs 63 with their spacer discs 64 and groups thereof, is effective for greatly reducing the tendency to any deposits of the materials sputtered from the work on the work supporting structure because of the line of sight shielding action by the upper discs 63 onto the spacer 65 and below the lower discs 63 onto the cover elements 61 of the cover 60.

We claim:

1. A power feed through for vacuum electric furnaces having hostile environment therein and containing electrically conductive ions capable of deposition on objects within the furnace which comprises a work support interiorly supported in the furnace and having an electrically conductive portion, an electrically insulated power conductor extending through the furnace wall and connected to said conductive portion of said work support, covering members for said power conductor comprising a plurality of separate non-electrical conductive elements in stacked relation on said power conductor and in engagement along said power conductor and having a portion extending exteriorly of the furnace, shielding means mounted on said conductor in spaced relation to said work support for shielding contiguous portions of said covering members from metallic deposition thereon, said shielding means comprising a plurality of parallel closely spaced readily replaceable discs of electrical non-conducting material, and vacuum sealing means outside said furnace for said covering members.

2. A power feed through as defined in claim 1 in which supporting members are provided for said work support, and said power conductor is electrically connected to one of said supporting members.

3. A power feed through as defined in claim 1 in which said elements are of the fish spine type.

4. A power feed through as defined in claim 1 in which said shielding members comprise an additional plurality of spaced discs spaced below said first plurality.

5. A power feed through as defined in claim 1 in which said power conductor is connected to a direct current power source for ionization.

* * * * *